INVENTOR.
RICHARD R. BOWER

Feb. 17, 1970   R. R. BOWER   3,495,316
APPARATUS FOR POSITIONING PARTS
Filed April 20, 1967   9 Sheets-Sheet 4

FIG_4

INVENTOR
RICHARD R. BOWER
BY
Christie, Parker & Hale
ATTORNEYS.

Feb. 17, 1970 R. R. BOWER 3,495,316

APPARATUS FOR POSITIONING PARTS

Filed April 20, 1967 9 Sheets-Sheet 7

FIG. 7.

INVENTOR.
RICHARD R. BOWER
BY Christie, Parker & Hale
ATTORNEYS.

Feb. 17, 1970     R. R. BOWER     3,495,316
APPARATUS FOR POSITIONING PARTS
Filed April 20, 1967     9 Sheets-Sheet 9

INVENTOR.
RICHARD R. BOWER
BY Christie Parker & Hale
ATTORNEYS.

United States Patent Office 3,495,316
Patented Feb. 17, 1970

3,495,316
APPARATUS FOR POSITIONING PARTS
Richard R. Bower, Northridge, Calif., assignor to Leach Corporation, San Marino, Calif., a corporation of Delaware
Filed Apr. 20, 1967, Ser. No. 634,044
Int. Cl. B23p *19/04*
U.S. Cl. 29—208                             19 Claims

ABSTRACT OF THE DISCLOSURE

Positioning apparatus having a turntable rotating in one direction only and an indexer to positively position the turntable. Fixtures mounted on the turntable to receive parts of varying configurations and hold them while the turntable rotates the parts into a position where the parts are needed for subsequent assembly operations. At the assembly position the fixtures advance the parts relative to the turntable to permit their assembly with other parts located there.

BACKGRIUND OF THE INVENTION

The present invention relates to apparatus for accurately positioning a part, and more particularly to apparatus for transforming a part from a first location to a second location and for positioning the part relative to a second part in the course of a repetitive manufacturing process.

The present invention is particularly well adapted for automatically transporting a part adjacent another part and for positioning the parts relative to each other in the course of a mass production process to secure the parts to each other as, for example, by welding them together. Where small parts, for example the components of a miniature electric relay, are to be welded together at a welding station on an assembly line, the transportation of parts to the welding station and their accurate positioning relative to each other represented a recurring problem. Little space is available in the vicinity of the welding station for the welding electrodes, the positioning apparatus, and for storage of a readily available supply of parts.

The mechanism for transporting one part adjacent another mounted on the assembly line were therefore complex, cramped, and always suspect of malfunctioning. Malfunctioning of only one part of an assembly line is costly because it sometimes results in prolonged down times of expensive machinery.

SUMMARY OF THE INVENTION

An apparatus constructed according to this invention includes a base secured to a support, a rotating shaft, and a base plate mounted on the shaft, and is rotatable in one direction relative to the base. A holder or fixture, which is one of a variety of holders, is secured to the base plate and receives a part in a first location that is removed from a second location where the part is to be positioned. The base plate is rotated relative to the base to transfer the part from the first to the second location whereby an index pin engages the base plate to accurately position the base plate, the holder and the part at the second location. The holders are provided with a movable member engaging the part to move the part into the desired position at the second location. The movable components are actuated by a central drive shaft to achieve synchronization of the various movements relative to each other.

This invention thus provides an apparatus to transport one part adjacent another part that may be mounted on an assembly line whereby the storage of a supply of parts as well as the apparatus itself are far enough removed from the vicinity of the welding station to construct the apparatus in a robust and simple manner. Neither accuracy nor reliability need therefore be sacrificed. The economy of an assembly line or the like for accurately welding miniature parts to each other is thereby substantially enhanced.

The apparatus comprising the present invention is a self-contained unit that is easily removed from one location and installed at another should the manufacturing process be altered, for example. It may, moreover, be adapted to handle parts of different configurations by correspondingly changing the holder that holds the part while it is transported and positioned. The invention is therefore highly versatile and greatly increases the utility of an assembly line or the like.

Lastly, the apparatus comprising the present invention is actuated by a drive shaft that is preferably connected to a main drive which actuates the assembly line or the like. Practically perfect synchronization between the assembly line and the present apparatus is thereby achieved which further contributes to the accuracy of positioning the parts relative to each other.

BRIEF DESCRIPTION OF DRAWINGS

FIG. 7 is a fragmentary side elevation in section of a holder including a pivotable clamp;

DESCRIPTION OF THE PREFERRED EMBODIMENT

Figure 2:
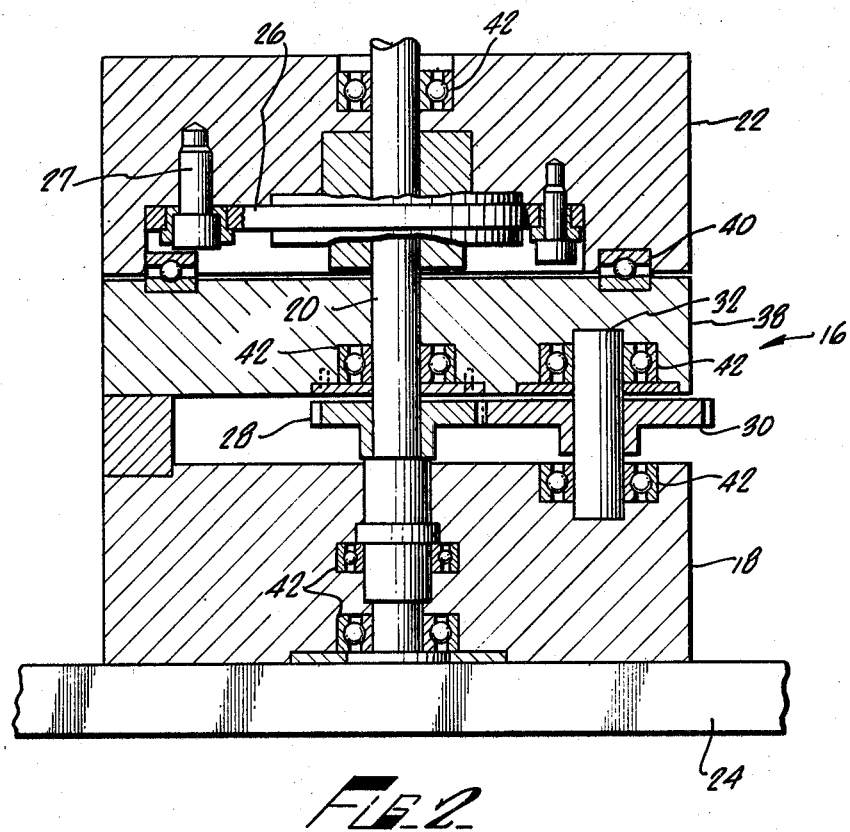
FIG. 2 is a fragmentary front elevation in section of a turntable only wherein the base plate is rotatably mounted on a shaft.

Referring first to FIG. 2, a turntable assembly 16 includes a base 18 and rotatably mounted therein a first shaft 20 that mounts a base plate 22 rotatable relative to the base 18. The base is secured to a suitable support 24, such as a table for example. The base plate is laterally spaced from the base. A one-way clutch 26 that is secured to the first shaft is bolted to the base plate by machine screws 27. The one-way clutch is well known and of conventional design, and engages the base plate and the first shaft whenever the first shaft is rotated in an engaging direction. If the first shaft is rotated in the opposite direction, the one-way clutch disconnects the base plate and the first shaft such that in spite of the shaft's rotation the base plate remains stationary. Intermediate the base plate and the base 18 is a first gear 28 mounted on the first shaft and engaging a second gear 30 rotatably mounted on a second shaft 32. Rotation of the second gear causes the first gear to rotate the first shaft. Depending on the direction of the rotation, the base plate is rotated or remains stationary relative to the base 18.

A spacer 38 is suitably secured to base 18 intermediate the base and base plate 22. The opposing faces of the spacer and the base plate are provided with annular grooves to receive a roller thrust bearing 40 which axially supports the base plate. Radial roller bearings 42 are disposed in the base and spacer to mount the first and the second shafts.

Figure 1:
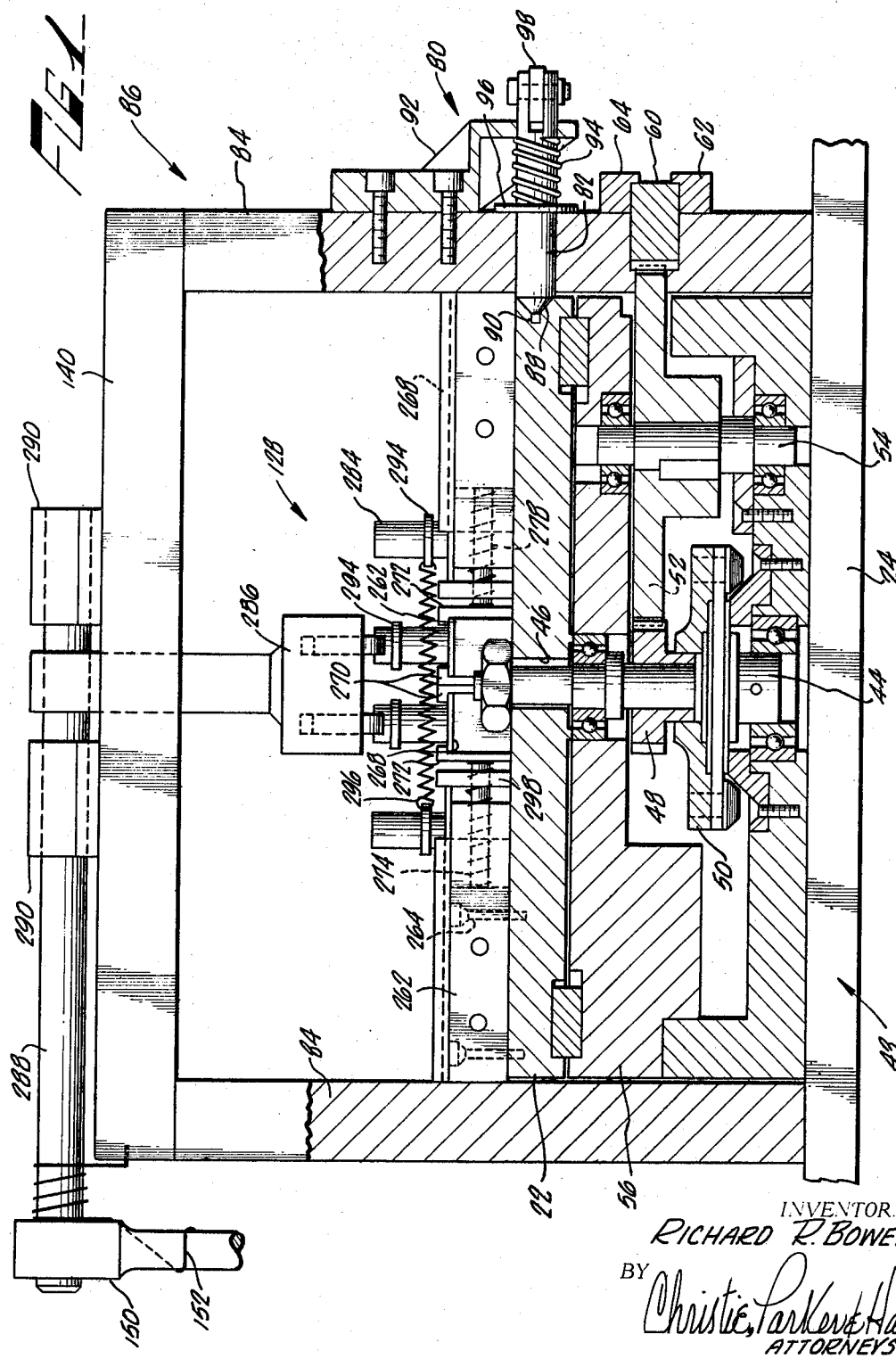
FIG. 1 is a front elevation in section of a preferred embodiment of the invention wherein a base plate is secured to a shaft, and showing a holder including a slide.

In another embodiment a turntable 43 includes base plate 22 which is mounted on a first shaft 44 and is secured thereto by a key 46, as shown in FIG. 1. A first gear 48 is mounted on the first shaft 44 intermediate the base and the base plate 22, and is secured to a one-way clutch 50 similar in operation to the one-way clutch 26 described in conjunction with the turntable assembly 16. The one-way clutch is further connected to the first shaft 44. When the first gear 48 is rotated in an engaging direction the clutch secures the gear to the first shaft and the shaft and the base plate 22 rotate with the gear. If the first gear rotates in the opposite direction, the clutch disengages the gear and the first shaft and the shaft remains stationary. A second gear 52 is rotatably mounted on a second shaft 54 and is in engagement with the first gear 48. Again, a spacer 56 is disposed intermediate base 18 and base plate 22 and is provided with suitable bearings to support both the first shaft 44 and the second shaft 54.

Figure 3:
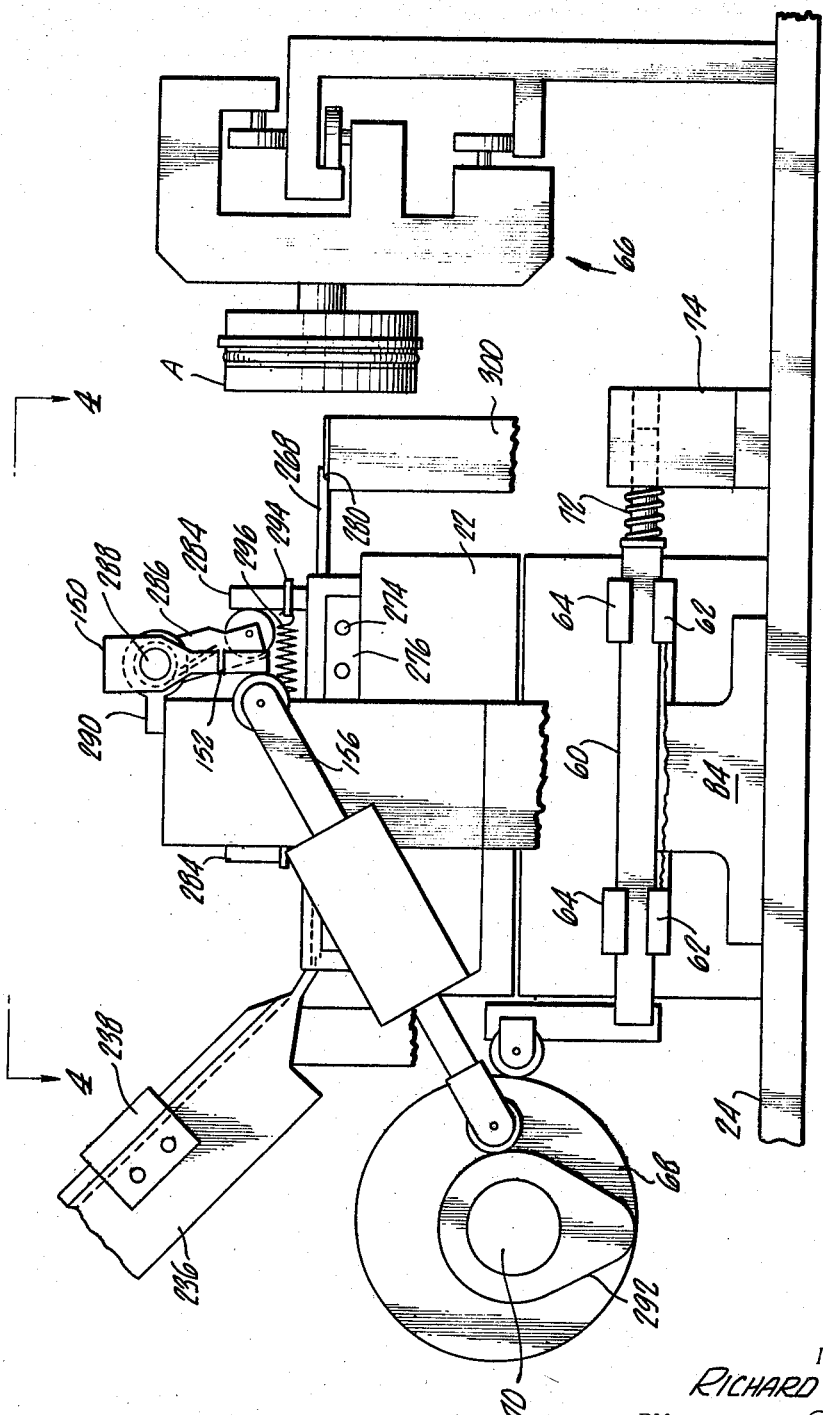
FIG. 3 is a side elevation, partially in section, of the holder shown in FIG. 1.

Turntable assembly 16 or turntable assembly 43 are rotated by a reciprocating gear rack 60 which engages the second gears 30 or 52, respectively. Suitable bearings 62 and 64 slidably mount the gear rack tangentially to the turntable assembly and in engagement with the second gear. As seen in FIG. 3, the end of the gear rack furthest removed from a carriage 66, which mounts and transports a part to which other parts are to be welded, is adjacent a cam 68 secured to a main drive shaft 70. The drive shaft is connected to drive means (not shown) advancing the carriage on a frame (not shown). The end of the gear rack 60 adjacent the carriage is connected to a helical compression spring 72 which, at its other end, is held by a suitable support 74. The spring biases the gear rack in a direction toward the cam 68 to insure constant contact between the gear rack and the cam. The cam advances the gear rack in the direction opposing the force of spring 74 to rotate the second gear. The one-way clutch 26 (FIG. 2) an the one-way clutch 50 (FIG. 1) rotate the base plate when the gear rack is advanced by cam 68. Spring 74 returns the gear rack to its original position when the receding position of the cam engages the gear rack. Although this movement of the gear rack again rotates the second gear, this time in the opposite direction, the base plate 22 remains stationary because it is disengaged from the second gear by the one-way clutch.

Figure 4:
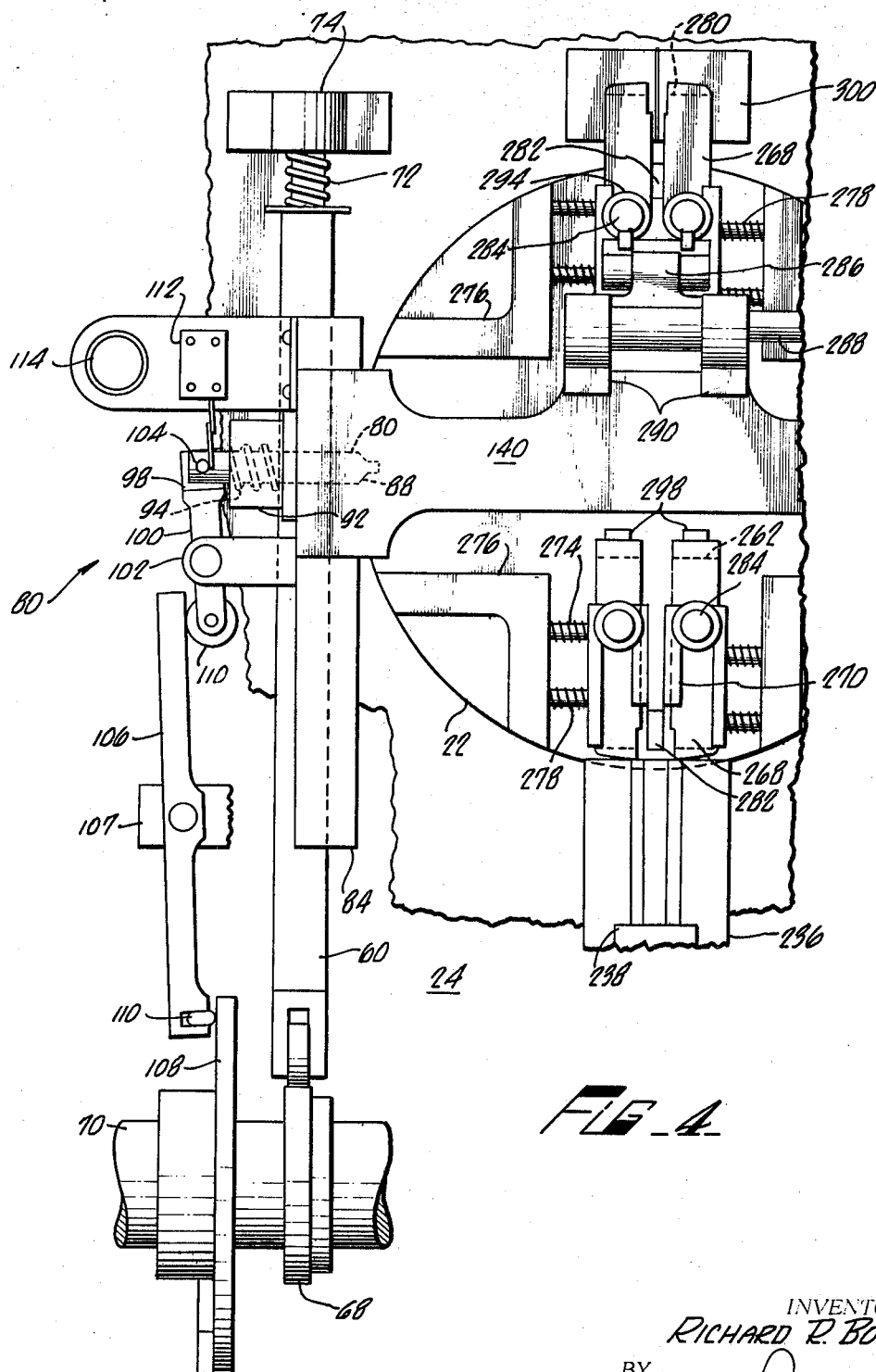
FIG. 4 is a fragmentary plan view taken along lines 4—4 of FIG. 3, showing a part to be transferred and positioned in phantom lines.

Indexing means 80, best shown in FIGS. 1 and 4, are provided to accurately position the base plate. The indexing means are necessary because of the inherent play and inaccuracies in a standard gear drive. They include an indexing pin 82 which reciprocates in a vertical member 84 of a frame 86. The indexing pin is provided with a conical end 88 that engages a corresponding conical bore 90 in base plate 22. A bracket 92 is suitably secured to the vertical member 84 of the frame. The bracket is provided with a bore to receive the end of the index pin opposite the cone. A helical compression spring 94 is disposed between bracket 92 and a flange 96 of the index pin 82 to bias the index pin toward the base plate. The end of the index pin opposite the conical end is bifurcated to receive a flat portion 98 of a first lever 100. A bracket 102 pivotally mounts the lever adjacent the vertical member 84. A pin 104 secures the flat portion 98 of the lever to the bifurcated leaves of the indexing pin. A second lever 106 is pivotally mounted on a base 107 secured to the support 24. One end of the second lever engages the first lever 100 and the other end a cam 108 secured to the drive shaft 70. The end of the first lever in engagement with the second lever and the end of the second lever in engagement with the cam are preferably provided with rollers 110 to reduce friction between the otherwise slidably cooperating parts. Roller 110 connected to the second lever engages the face of cam 108 which is partially recessed to pivot the lever.

Spring 94 biases the indexing pin toward the base plate so that the first lever is in constant engagement with the second lever and the second lever is constantly biased toward the face of cam 108. As the second lever approaches the recessed portion of the face of the cam it pivots in a counterclockwise direction, as viewed in FIG. 4, thereby permitting the second lever to rotate in a clockwise direction. This frees the index pin to travel toward the base plate 22 under the force exerted by spring 94. Cams 68 and 108 are synchronized to release the index pin 82 after the base plate is rotated and when it approaches the desired position. As cam 108 releases the index pin and the index pin engages the conical bore in the base plate to accurately position the base plate relative the support 24, cam 68 ceases to rotate the base plate.

The index pin is additionally connected to an electric microswitch 112 that must be actuated each time the base plate comes into the desired position in order to not de-energize the main drive, to which both the carriage 66 and the main drive shaft 70 are connected. The electrical microswitch is only actuated if the indexing pin properly engages the conical bore 90 in the base plate 22. Failure of the index pin to so engage the base plate causes the electric microswitch to stop the machine from further operating. The microswitch is additionally connected to an indicator lamp 114 which is illuminated to indicate failure of the indexing pin to engage the base plate. Therefore, should the turntable fail to properly locate the base plate, which will prevent the index pin from entering the conical bore 90, or should the index pin fail to engage the conical bore, which may cause the base plate to be improperly positioned, the apparatus is de-energized. The indicator lamp is illuminated to facilitate locating the trouble spot. The apparatus can only be re-energized after the indexing pin has been properly located in the conical bore 90.

Figure 5:
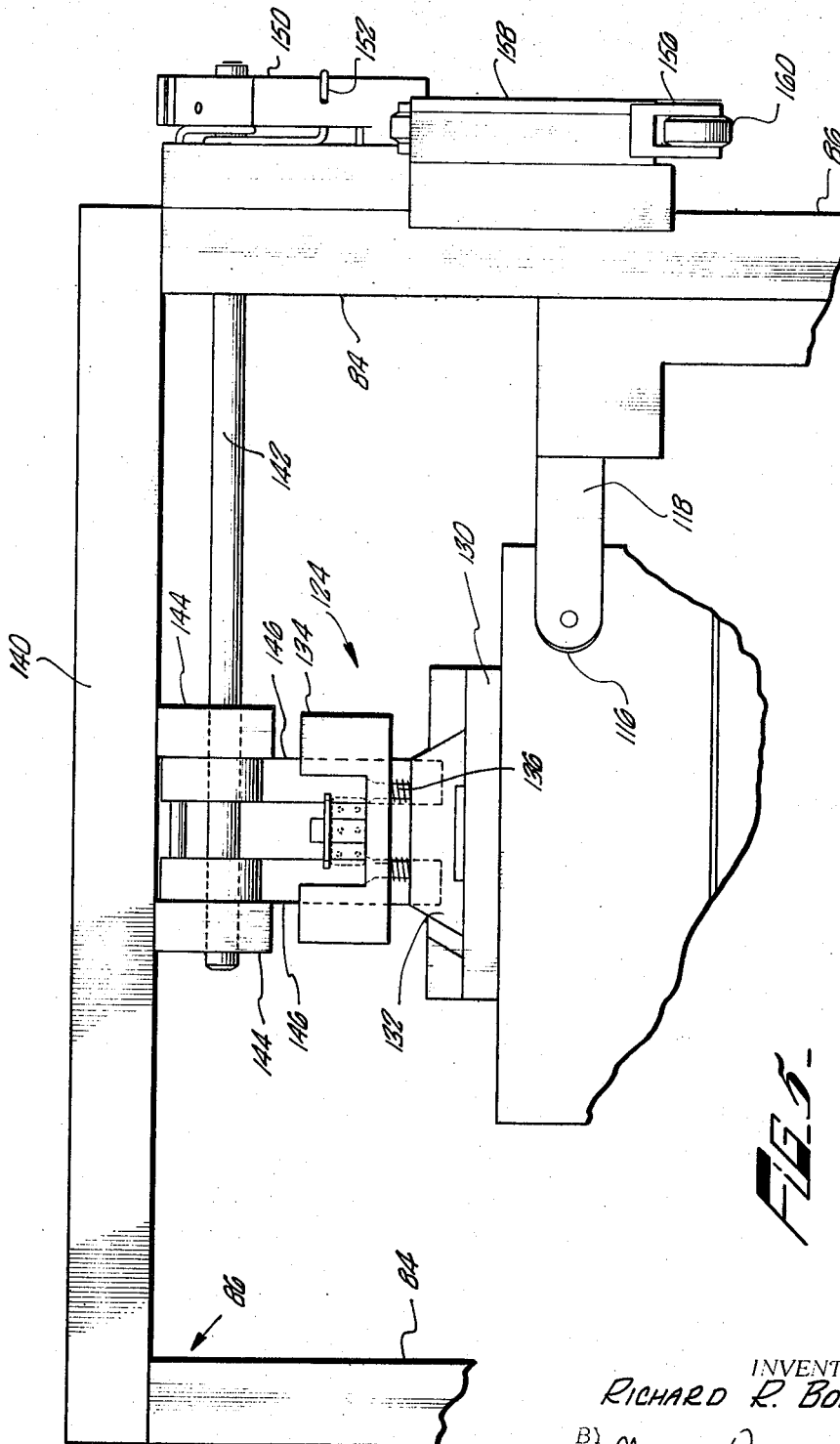
FIG. 5 is a fragmentary front elevation of a vertically adjustable holder.

To prevent the base plate 22 from over-rotation due to its inertia, a friction button 116 shown in FIG. 5 is biased toward the periphery of the base plate by a leaf spring 118. The leaf spring is mounted on the vertical member 84 of the frame 86. The friction button provides a frictional force sufficient to prevent the base plate from rotating unless it is in engagement with and forced by the reciprocating gear rack 60.

Secured to base plate 22 is either one of heads of fixtures 124 (best shown in FIGS. 5 and 6), 126 (best shown in FIGS. 7 and 8), and 128 (best shown in FIGS. 1, 3 and 4), which hold a part to be located adjacent the carriage 66.

Figure 6:
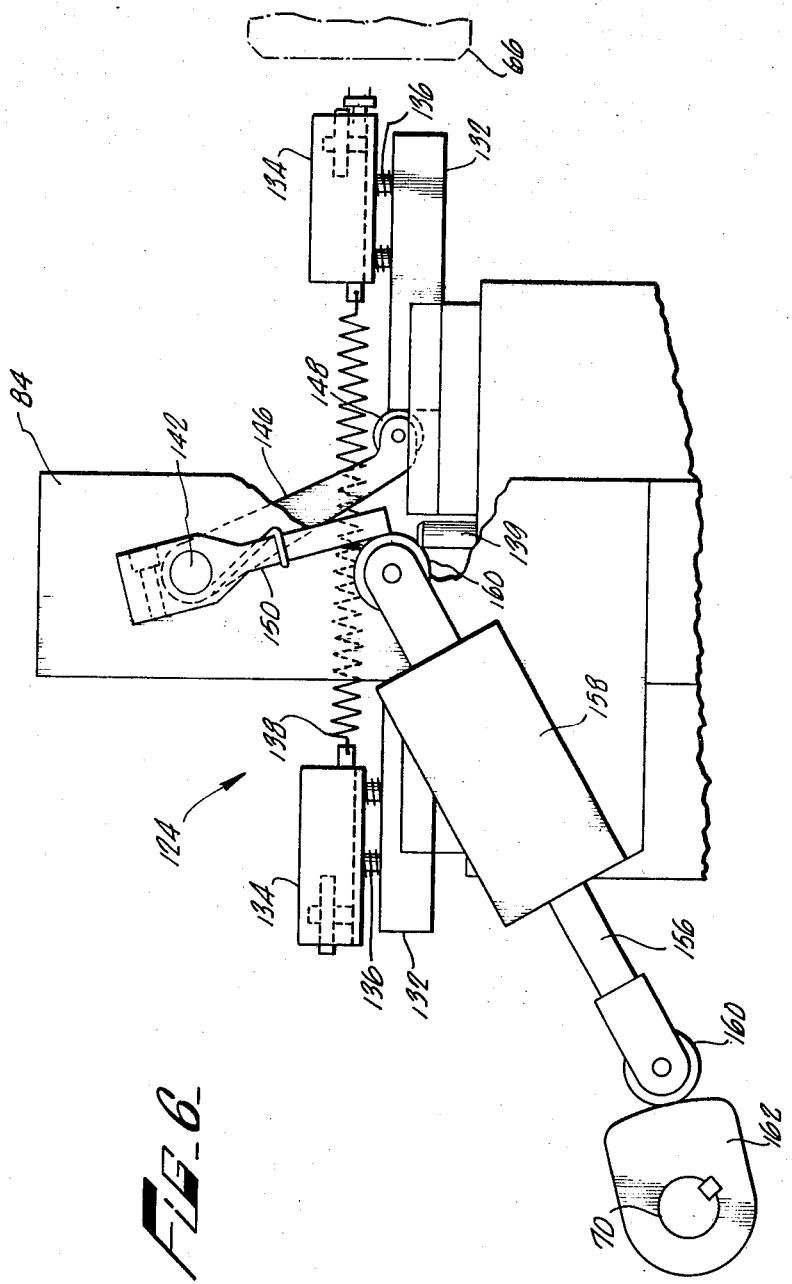
FIG. 6 is a fragmentary side elevation of FIG. 5 with parts broken away.

Referring now to FIGS. 5 and 6, the head 124 comprises a slide base 130 secured to the base plate and a dovetailed slide 132 reciprocating in the slide base. A holder 134 is provided with means to hold a part (shown in phantom lines in FIG. 5) while the base plate, the slide and the holder are rotated into a position where the part is adjacent the carriage 66. The holder is provided with a plurality of holes (not shown) that receive machine screws secured to the slide 132. Disposed between the underside of the holder and the side of the slide adjacent the holder are compression springs 136 which bias the holder in a direction away from the slide. The vertical position of the part held in the holder adjacent the carriage may be varied by means (not shown) that engage the holder 134 and force it in a direction toward the slide and against the force of the springs 136.

As best seen in FIG. 6, the slide base 130 is preferably provided with two laterally aligned slides, each of which mounts a holder 134. A spring 138 is connected to each slide at the end adjacent the other slide whereby the slides and the holders are biased toward each other. Stop means, such as pins 139 inserted in the slide base, are provided to limit the movements of the slides toward each other.

A horizontal member 140 of the frame 86 is disposed between and connected to a pair of vertical members 84. A pivoting shaft 142 is journaled in bearings 144 that are mounted on the horizontal member in a spaced-apart relationship. A lever 146 is secured to the pivoting shaft and is preferably provided with a roller 148 that may alternatively engage one of the holders 134 when the shaft is pivoted, thereby advancing one holder in a direction away from the other. Retraction of the lever 146 causes the holder to be biased back into a position where it contacts the pins 139. The lever is secured to shaft 142 and constructed such that it engages the holder adjacent the carriage 66 and moves the holder toward the carriage when it is pivoted.

As best seen in FIG. 5, one end of the pivoting shaft 142 extends through a hole in the vertical member 84. Referring now to FIG. 3 secured to the end of the pivoting shaft is a crank arm 150 that is biased in a clockwise direction, as viewed in FIG. 3, by a torsion spring 152. A push rod 156 slidably reciprocates in the elongated guide block 158 and is provided with rollers 160 on either end whereby one roller engages crank arm 150 and the roller at the opposite end of the push rod engages a cam 162 mounted on drive shaft 70. As the drive shaft rotates, cam 162 forces the push rod 156 toward the crank arm 150 thereby pivoting shaft 142 and lever 146 which engages the holder 134. The torsion spring 152 causes the push rod to follow the receding portion of cam 162 whereby the lever 146 is pivoted in a clockwise direction, as viewed in FIG. 3. The holder 134 returns to its original position adjacent the stop means 139 under the force exerted by spring 138.

Figure 8:
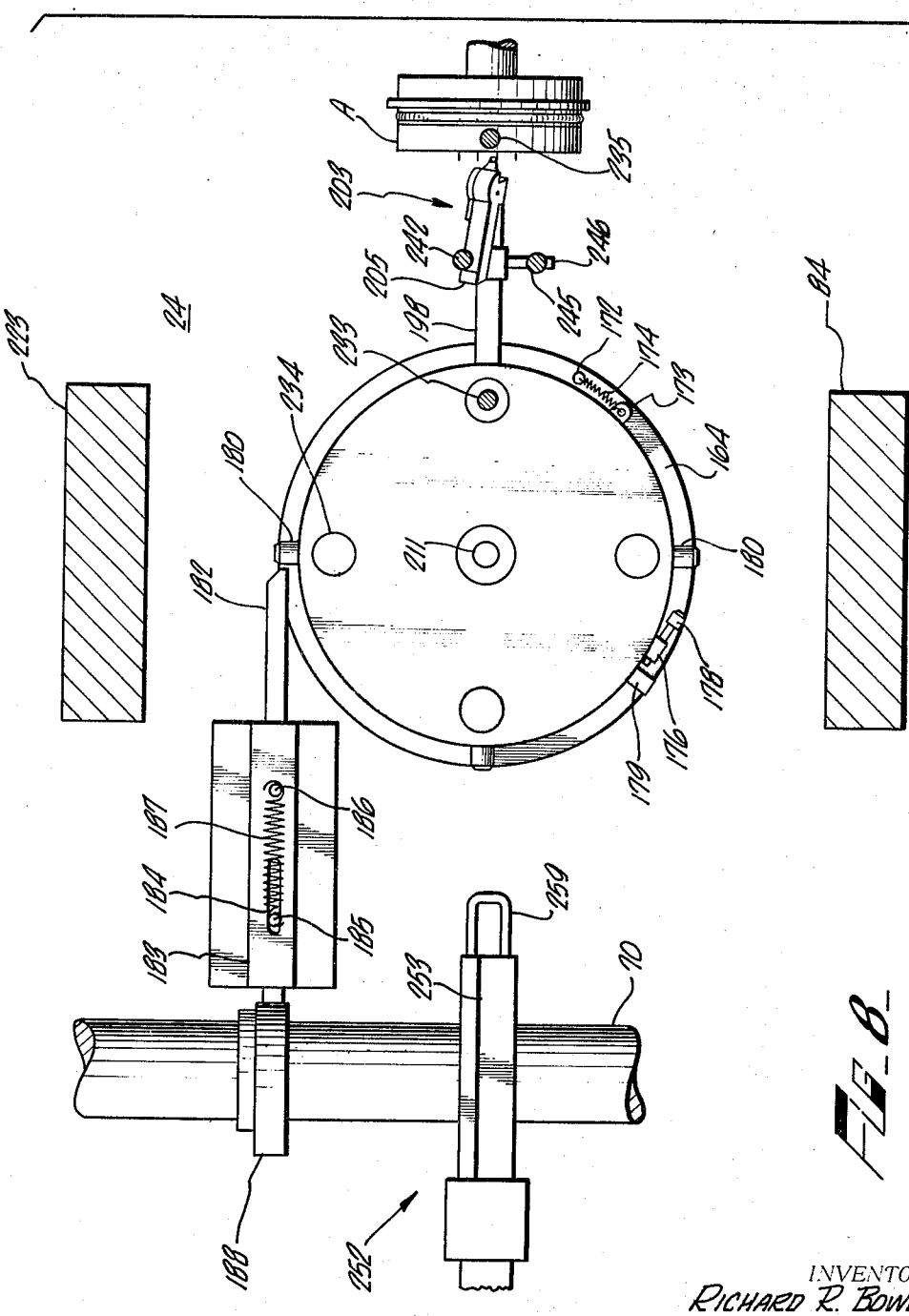
FIG. 8 is a sectional plan view taken along line 8—8 of FIG. 7.
Figure 9:
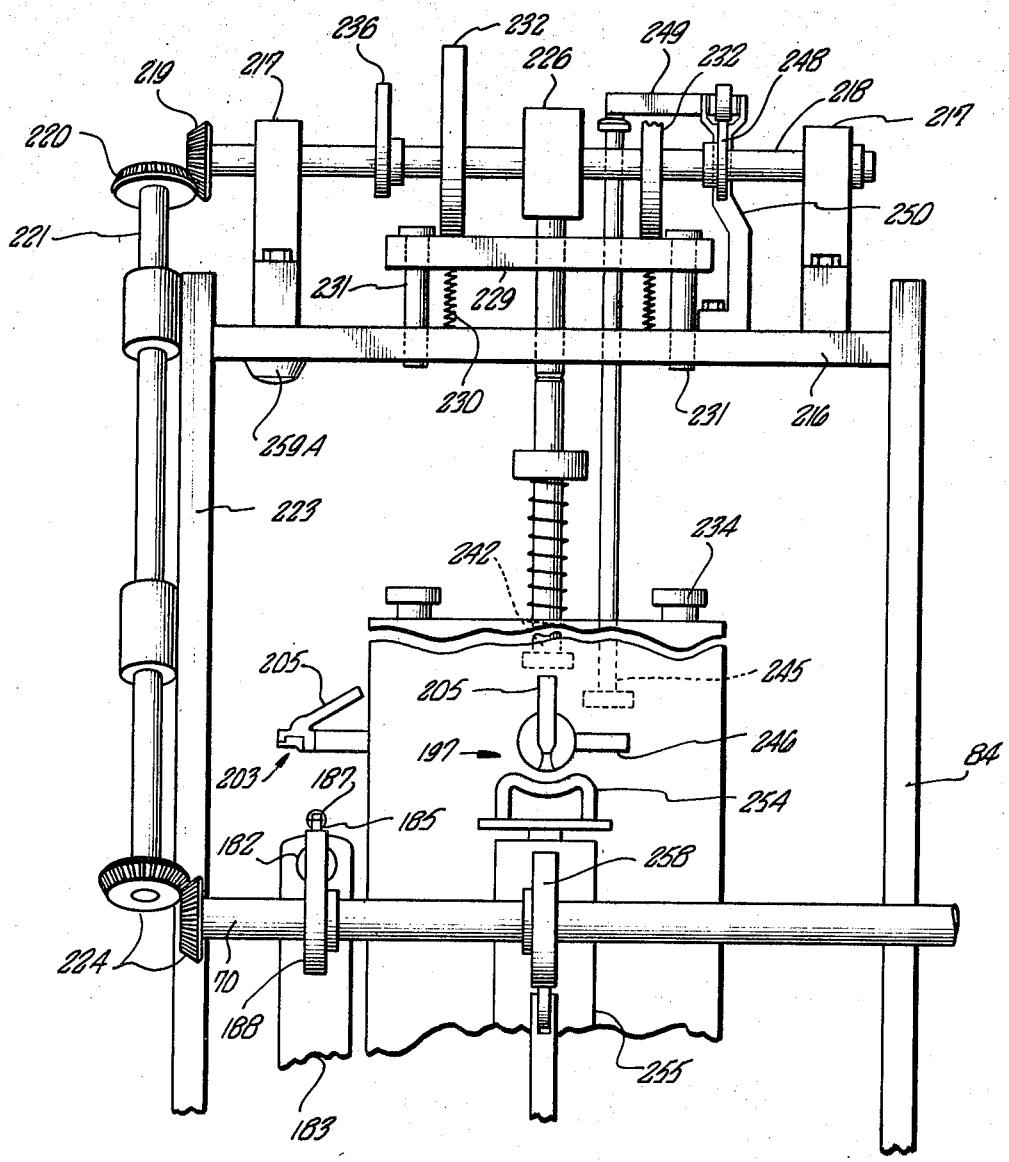
FIG. 9 is a fragmentary side elevation taken along lines 9—9 of FIG. 7.

Head 126, best shown in FIGS. 7, 8 and 9, is shown mounted on a turntable assembly 16. The first shaft 20 extends beyond the base plate 22 and centers a bearing plate 164, a spacer 165, and a cylindrical flange 166. The bearing plate is connected to the base plate by machine screws 167 and the spacer is connected to the cylindrical flange by machine screws 168. A thrust bearing 170 is disposed between the cylindrical flange and a retaining washer 171 which is connected to the face of the first shaft 20. The cylindrical flange and the spacer are thereby snugly held against the bearing plate on the base plate.

The face of the bearing plate is provided with a vertical post 172 and the periphery of the cylindrical flange is provided with a horizontal post 173 which is in a spaced-apart relationship to the vertical post. Disposed between the vertical and horizontal posts is a tension spring 174 that biases the flange and the spacer in a counter-clockwise direction relative to the bearing plate and the base plate, as viewed in FIG. 8. A lug 176 is suitably secured to the face of the bearing plate 164 and is provided with a threaded hole that receives a set screw 178. The axis of the set screw is tangential to the periphery of the cylindrical flange and engages a stop pin 179 which extends radially from the periphery of the flange. The tension spring 174 biases the flange and the spacer in a counter-clockwise directions, as viewed in FIG. 8, until the stop pin rests against the set screw. At this position the cylindrical flange is in an original position.

Pins 180 extend radially from the periphery of flange 166 and are engageable by a reciprocating ram 182. The ram reciprocates in an elongated journal 183 that is suitably mounted on the support table 24. The journal is provided with an elongated slot 184 through which a transverse pin 185 extends. A second transverse pin 186 is secured to the periphery of the journal and is aligned with pin 185. Disposed between pins 185 and 186 is a tension spring 187 which biases the ram away from pins 180 in the flange and toward the main drive shaft 70. A cam 188 secured to the main drive shaft engages the ram 182 and reciprocates it.

When the ram is advanced toward the pin 180 in flange 166, the flange may be rotated relative to the bearing plate 164 and the base plate 22 which are secured against rotation by the index pin 82. The ram rotates the flange against the force of tension spring 174 which returns the flange into the original position when the ram is retracted.

A cylindrical body 190 slidably fits over a recessed portion 191 of the cylindrical flange 166. A plurality of dowel pins 192 center the body relative to the flange. Cap screws 193 are threaded into the cylindrical flange and hold the body against the force of compression springs 194 to the flange such that the body is permitted to move relative to the flange in a downward direction, as seen in FIG. 7.

A holder 196 includes a jaw 197 and a shaft 198. The shaft extends in a radial direction from the center of the body and is secured to the body in a bore 199. A recessed portion 191 of the flange is provided with an enlarged bore 200 to permit a compression spring 201 to be mounted between the body and a flange 202 on the shaft 198. The compression spring thereby biases the holder in a direction toward the center of the body.

The jaw includes a pivotally mounted clamp 203 which is biased into a closed position by a torsion spring 204. The clamp includes in upwardly extending lever 205 to enable the jaw to be opened by depressing the lever against the force of spring 204. A cross pin 206 pivotally mounts the jaw onto the shaft 198 and a torsion spring 207 biases the jaw into alignment with the axis of the shaft, see FIG. 7. The jaw is further provided with a coupling 208 to enable the jaw to be pivoted in an axis aligned with that of shaft 198. The coupling is disposed intermediate clamp 203 and cross pin 206. The coupling comprises two like halves 208A and an internally arranged spring (not shown) to bias the jaw into an original position relative the shaft 198.

The other end of shaft 198 is provided with a cam follower 209 that engages a conical plunger 210. The conical plunger is provided with lateral recesses 210A on the periphery of the plunger which guide the cam follower 209 and prevent it, together with the shaft 198, from rotating in the cylindrical body 190. The plunger is secured to a center shaft 211 which is vertically mounted in body 190 and includes a knurled nut 212 secured to the center shaft outside the cavity 213 defined by the flange 166 and the body, and which is spaced away from the body. A compression spring 214 is disposed between the body and the knurled nut and biases the center shaft together with the conical plunger into an upward direction.

Referring to FIGS. 7 and 9, a horizontal tie bar 216 is secured to and disposed between the vertical member 84 and a vertical member 223 of the frame 86. A pair of journals 217 mount a camshaft 218 parallel to and above the tie bar 216. One end of the camshaft extends beyond a journal and receives a bevel gear 219. A second bevel gear 220 is secured to a downwardly sloping shaft 221 that is mounted in a pair of journals 222 which are secured to the vertical member 223 of the frame. A pair of bevel gears 224 is secured to the main drive shaft 70 and the other end of the downwardly sloping shaft. The main drive shaft thereby is in engagement with camshaft 218 and rotates the camshaft by way of the bevel gears and the sloping shaft 221.

A first cam 226 is secured to the camshaft and is in engagement with a plunger 227 which is guided through the horizontal tie bar 216 into contact with the upper end of the center shaft 211. Rotation of the first cam advances the conical plunger 210 downwardly such that the holder 196 moves in a lateral direction away from the center of the body.

The tie bar 216 extends transverse to the camshaft and toward a welding head A in the second position such that it covers the area above the holder 196 adjacent the welding head. A die plate 229 shaped substantially similar to tie bar 216, is disposed parallel to and is biased away from the tie bar by a plurality of compression springs 230. A pair of guide pins 231 are connected to the die plate and slide in snugly fitting holes in the tie bar to position the die plate. A pair of second cams 232 are secured to the camshaft 218 and engage the die plate which is biased toward the second cams by the springs 230.

A first push rod 233 is secured to the die plate and extends through the tie bar such that the lower end of the first push rod is above a pin 234 secured to the body 190 and extending above the horizontal face of the body. A second push rod 235 is secured to the end of the tie bar furthest removed from the camshaft if the welding head A is movable in a vertical direction.

A third cam 236 is secured to the camshaft intermediate the second cam 232 and the journal 217. It engages a cam follower 237 mounted on one end of a rocker arm 238. A support bracket 239 includes bifurcated ends 240 between which the rocker arm is pivotally mounted by a cross pin 241. The other end of the rocker arm is in engagement with a third push rod 242 which is biased toward the rocker arm by a compression spring 243 disposed between the die plate 229 and the upper end of the third push rod. The third push rod extends through both the die plate 229 and the tie bar 216 and is disposed such that its lower end can engage the lever 205 of the clamp on jaw 197 when the jaw is adjacent the welding head A. Disposed between the tie bar 216 and the die plate 229 is another compression spring 244 which biases the die plate away from the tie bar similar to the springs 230 in order to obtain an even distribution of the spring forces against the die plate and to prevent the die plate from cocking.

A fourth push rod 245 is located tangentially to the shaft 198 when the holder 196 is adjacent the welding head A and engages a transverse pin 246 attached to the jaw 197 to rotationally move the jaw relative to the shaft.

The fourth push rod is mounted in the die plate and the tie bar in the same manner as is the third push rod. It is actuated by a fourth cam 248 which pivots a rocker arm 249 mounted on a support bracket 250 as best seen in FIG. 9.

A storing and feeding mechanism 252 is preferably located opposite the welding head A such that a part stored in the mechanism has to be rotated by the jaw 180° to position it adjacent the welding head. In a preferred arrangement of the storing and feeding mechanism the parts are stored on a slide 253 which is inclined to permit the parts to be fed to the jaw by gravitational means. The storing and feeding mechanism is actuated and controlled by cams (not shown) secured to the main drive shaft 70.

In order to properly insert the part into the jaw 197, the jaw has to be pivoted in an upward direction, as best seen in FIG. 7. To pivot the jaw the apparatus is provided with a generally U-shaped push bar 254 which reciprocates in a vertical direction in a holder 255 secured to the support table 27. The push bar 254 includes a transverse pin 256 which is in engagement with a pivotally mounted rocker arm 257. A cam 258 mounted on the main drive shaft 70, pivots the rocker arm and reciprocates the push bar. When the push bar is advanced in an upward direction, as seen in FIG. 7, the jaw is pivoted until it is in alignment with the slide 253 of the storing and feeding mechanism. A fixed arm 259 is secured to the slide and engages the lever 205 of the clamp 203, thereby opening the jaw and permitting the storing and feeding mechanism to insert a part into the jaw. When the push bar 254 is retracted, the spring 204 pivots the jaw back into alignment with the rotatable shaft 198. Simultaneously, the clamp 203 of the jaw is closed and the part is securely held.

To assure that a part is held by the jaw when it is moved toward the welding head, a photoelectric cell 259A is disposed intermediate the storing and feeding mechanism and the welding head. Preferably, the photoelectric cell is located at 90° or half way between the storing and feeding mechanism and the welding head. When the head 126 is rotated to position a part adjacent the welding head, the photoelectric cell senses whether or not a part is actually secured in the jaw. The photoelectric cell is connected to a relay (not shown) which is actuated to de-energize the main drive shaft 70 as well as the drive means (not shown) of the apparatus transferring the welding head whenever the photoelectric cell senses that no part is secured to the jaw. This controls the proper functioning of the head 126 and avoids the necessity for subsequently rejecting relays that have been improperly welded together.

Preferably, head 126 is provided with four holders 196 disposed at 90° from each other. This permits a part to be deposited at the welding head every time the turntable assembly 16 is rotated by 90°. The construction of the cylindrical flange 166 and the body 190 remain unchanged except that four bores 199 and 200 are provided. The conical plunger 210 includes four lateral recesses 210A spaced at 90° from each other and simultaneously actuates all four holders.

In operation, a sufficient supply of parts to be transferred adjacent the welding head are stored in the storing and feeding mechanism 252 and every time a holder is adjacent the storing and feeding mechanism a part is advanced into the jaw. After the part is located in the jaw, the push bar 254 is retracted whereby the jaw becomes closed and laterally aligned with the rotatable shaft 198. The turntable assembly 16 is energized, as described earlier, and rotates the head 126 by 90°, whereby the holder is positioned half way between the storing and feeding mechanism 252 and the welding head A. The photoelectric cell 259A senses whether or not a part has actually been deposited in the body, and, if such part has been deposited, the turntable assembly is again rotated 90°, whereby the holder is adjacent the welding head.

The welding head secures a relay header which includes a plurality of contact pins and at least one pair of stationary contacts that form a narrow gap between them. One end of the part, which is a movable blade, has to be inserted in the gap between the stationary contacts on the relay header while the opposite end of the movable blade has to be positioned adjacent another contact pin of the relay. In order to facilitate the insertion of the movable blade in the gap, the holder, after it has been rotated 180° from the storage and feeding mechanism, holds the movable blade adjacent to but not within the gap. The first and second push rods 233 and 235, respectively, are to align the movable blade with the gap between the stationary contacts. Assuming the welding head to be of the type disclosed in my above referred to copending patent application, the second cams 232 depress the die plate 229 against the force of springs 230 and 244. In their depressed position, the first push rod 233 engages pin 234 and the second push rod engages a movable component of the welding head such that the moving blade and the gap between the stationary contacts are horizontally aligned.

The first cam 226 now advances plunger 227 toward the center shaft 211 and against the force of spring 214. This moves the conical plunger in a downward direction, as seen in FIG. 7. The downward movement of the conical plunger advances the holder 197 toward the welding head until the movable blade held by the jaw is adjacent the gap between the stationary contacts of the relay header on the welding head.

The movable blade may now be inserted in the gap by actuating ram 182 which engages pin 180 and rotates the holder 196 together with the body 190 and the cylindrical flange 166 relative to the bearing plate 164 and the base plate 22. The base plate is secured against being rotated by index pin 82, as described above. The movement is adjusted such that it is sufficient, but not more than necessary, to insert one end of the movable blade in the gap between the stationary contacts. One end of the movable blade in the gap is to contact the lower one of the two stationary contacts while the other end of the movable blade is to be welded to a contact pin of the relay header and is to contact the underside of that contact pin. For this purpose the movable blade is to be twisted to permanently deform it so that it will have the required configuration. The fourth push rod 245 performs the twisting operation by being advanced toward the transverse pin 246 until it engages the transverse pin and causes the jaw to be rotated relative the shaft 198. This rotation deforms the movable blade. Thereafter the fourth push rod is retracted.

At this point, while the first and second push rods maintain the jaw and the welding head in an aligned position, suitable electrodes (not shown) are advanced from below and above the relay header mounted on the welding head. These electrodes then weld the movable blade to the contact pin. After welding, the electrodes are retracted to their original position. Simultaneously with the retraction of the electrodes, the first and the second push rods are retracted to release the head 126 and the welding head A into their original position, and the third push rod 242 is advanced toward the lever 205 of the jaw 197 until it engages the lever and opens the clamp to release the movable blade from the grasp of the jaw. The jaws are now free to be retracted, which is accomplished by rotating the first cam 226 such that plunger 227 permits the center shaft 211 to be moved in an upward direction by the compression spring 214. As the center shaft moves upwardly, the conical plunger 210 permits the compression springs 201 to retract the holders 196 toward the center of the head 126. At the same time, the third push rod 242 is retracted to release the clamp on the jaw. The holder 196 adjacent the welding head may now be rotated 180° to again locate adjacent the storing and feeding mechanism 252. The push bar 254 there engages the jaw and pivots it into alignment with slide 253, whereby the jaw is opened and a new movable blade is inserted in the jaw to repeat the just-described operation.

Head 128, as best seen in FIGS. 1, 3 and 4, is used to transfer and locate a part of yet another configuration adjacent the carriage 66. For illustrative purposes head 128 is shown mounted on the base plate 22 and the turntable assembly 43, but it may also utilize the turntable assembly 16 shown in FIG. 2.

Head 128 comprises a stationary slide 262 secured to the base plate 22 by suitable means such as machine screws 264. The slide 262 is an elongated rectangular block with a flat upper surface on which an elongated pusher 268 slides in a lateral direction. An angularly shaped stationary guide track 270 is secured to the slide such that a short leg 271 of the stationary guide track overlaps the upper surface of the slide and defines a space between the inside edge of the short leg and the upper surface of the slide which receives the elongated pusher 268. Opposite the stationary guide track is a movable guide track 272 that has the same configuration as the stationary guide track but which is mounted on a plurality of transverse pins 274 that are secured to the slide and to a support bracket 276 mounted on the base plate 22. Guide track 272 is movable in a direction transverse to the lateral axis of the slide. Compression springs 278 are disposed between the support bracket and the movable guide track to bias the guide track toward the slide. The short leg of the guide track 272 defines a space similar to the space defined between the stationary guide track and the upper surface of the slide to receive the elongated pusher 268. The pusher 268 can thus slide on the upper surface of the slide 262 as defined by the stationary guide track 270, and is biased into engagement with the stationary guide track by the compression spring 278 and the movable guide track 272.

In the presently preferred embodiment of this invention, two pushers 268 are arranged adjacent each other and travel parallel and simultaneously with each other to deliver two parts adjacent the carriage 66. The end of the pusher furthest removed from the center of the turntable and the base plate 22 is provided with a transverse recess 280 that defines a gap between the recessed portion of the pusher and the slide 262. The recess has a configuration to receive a part that is to be transferred to a position adjacent the carriage. In the preferred embodiment utilizing adjacently arranged pushers, a vertical spacer 282 is disposed between the adjacent edges of the two pushers, as best seen in FIG. 4, to space a pair of parts relative to each other. The stationary guide tracks 270 are shorter than the movable guide tracks 272 to permit the spacer to be placed between the adjacent edges of the pusher in the vicinity of the ends of the pushers when the pushers are in a retracted position.

At a location removed from the carriage 66 and preferably opposite to and 180° from the carriage are means 236 for storing a supply of parts and means 238 for transferring a part or a pair of parts from the storage means to the transverse recess 280. The storage and transferring means do not form part of this invention and their description has, for brevity, been deleted. When the pushers are located adjacent the transferring means they are in a retracted position whereby the transverse recesses 280 are located on the slides 262. After insertion of the parts in the transverse recesses, the base plate 22 together with the head 128 is rotated in a position adjacent the carriage 66 where the parts are then welded to another part secured to the carriage. Indexing means 80 including indexing pin 82, microswitch 112 and indicator lamp 114 are provided to assure accurate location of the head 128 relative to the carriage 66 and to de-energize the apparatus should the indexing means fail to properly locate the head 128.

The pushers 268 are preferably provided with transverse and vertical stems 284 secured to the pusher and engaging a pivoting lever 286 which moves the pushers in a direction toward the carriage 66 when they are in a position adjacent the carriage. The pivoting lever 286 (FIG. 1) is mounted on a pivoting shaft 288 which is journaled in a pair of journals 290 secured to the horizontal member 140 of the frame 86. One end of the pivoting shaft extends beyond the vertical member 84 and is provided with a lever 150 that is biased in a neutral position by a torsion spring 152 and that is in engagement with the push rod 156. The push rod engages a cam 292 secured to the main drive shaft 70. The pivoting lever 286 is actuated by cam 292 in the same manner as the pivoting lever 146 is actuated by cam 162 and as described in conjunction with the head 124.

Head 128 is preferably provided with laterally aligned pairs of slides, guide tracks, and pushers, disposed at opposite points adjacent the periphery of the base plate 22. A second pair of laterally aligned guide tracks, slides, and push rods may be provided at 90° from the first pair. In this preferred arrangement the stems 284 are fitted with collars 294 that receive tension springs 296 which are connected to the collars of laterally aligned and opposing stems. Stop means 298 are secured to the base plate 22 to limit the travel of the pusher in a direction toward the center of the base plate. The tension springs 296 hold the pushers adjacent the stop means 298 except when a pair of pushers is adjacent the carriage 66 and moved toward the carriage by the pivoting lever 286.

In operation, the parts are positioned in the transverse recesses 280 of the pushers 268 at a position opposite the carriage 66. The turntable is actuated as described above to rotate the base plate 22 and the head 128 until a pair of pushers is adjacent the carriage. If the parts located in the transverse recesses are to be welded to a part located on the carriage, say, the contact pins of an electric relay, an electrode 300 is adjacent to and level with the slide 262 such that pivoting lever 286 may be actuated to move the pusher together with the parts located in the recess onto the electrode. Release of the pivoting lever 286 into its neutral position permits the pushers to return to the position adjacent the stop means 298, leaving the parts that were located in the transverse recesses on the electrode. The electrode then suitably welds the parts to another part located on the carriage.

Although the various components of the present invention have herein been described as separate units, they are readily interchangeable with each other and may be used to form a unitary locating and positioning apparatus for transferring parts of varying configurations to a position adjacent another part as required in the course of an assembly line operation.

I claim:

1. Apparatus for rotating a first part from a first location to a second location adjacent a second part and for positioning the first part relative to the second part, the apparatus including a base secured to a support means for rotatably mountting a base plate on the base in a spaced-apart relationship, rotating means for unidirectionally rotating the base plate relative to the base from the first location to the second location, indexing means including a reciprocating index pin to position and secure the base plate relative to the base, holding means for holding the first part adjacent the base plate, positioning means for moving the holding means and the first part relative the base plate toward the second part at the second location, means for biasing the holding means away from the second part, and a main drive shaft actuating the rotating means, the positioning means, and the indexing means.

2. Apparatus according to claim 1 wherein the means for unidirectionally rotating the base plate include a first shaft rotatably mounted in the base and the base plate, means for rotating the first shaft relative to the base, and a one-way clutch secured to the first shaft and base plate to unidirectionally rotate the base plate relative to the base.

3. Apparatus according to claim 2 wherein the means for rotating the first shaft include a second shaft mounted in the base, a first gear secured to the first shaft, a second gear mounted on the second shaft and operatively engaging the first gear, and means for rotating the second gear.

4. Apparatus according to claim 3 wherein the means for rotating the second gear include a reciprocating gear rack in engagement with the second gear, a cam secured to the drive shaft and in engagement with the gear rack, and means for laterally biasing the gear rack toward the cam.

5. Apparatus according to claim 2 wherein the holding means include a holder spring biased in a direction away from the face of the base plate for holding the first part, the holder being slidably secured to the base plate to slide in a plane parallel to the face of the base plate and means for moving the holder and the first part in the second location parallel to the face of the base plate toward the second part, and spring means for biasing the holder away from the second part.

6. Apparatus according to claim 5 including a plurality of holders laterally aligned in pairs and wherein the means for biasing the holder away from the second part include a spring connected to a pair of holders to bias the holders toward each other and stop means for limiting the travel of the holders toward each other.

7. Apparatus according to claim 2 wherein the holding means include a flange movable secured to the base plate, a body movable relative to the flange in a first direction, the body being secured to the flange, and spring biased in a direction away from the base plate, a reciprocating holder mounted in the body to be rotatable relative to the body on an axis transverse to the first direction, means for reciprocating the holder, means for rotating the holder while the first part is adjacent the second part, and means for moving the body relative to the flange in the first direction.

8. Apparatus according to claim 7 wherein the means for reciprocating the holder include a conical plunger engaging the holder and reciprocating in the first direction to move the holder and the first part toward the second part, means for reciprocating the plunger, and means for biasing the holder toward the plunger.

9. Apparatus according to claim 8 wherein the means for rotating the holder include a reciprocating push rod, means for reciprocating the push rod, a transverse pin connected to and radially extending from the holder to engage the reciprocating push rod and thereby rotate the holder and the first part, and means biasing the holder into an original position.

10. Apparatus according to claim 9 wherein the means for reciprocating the plunger and the push rod include a rotating shaft mounted adjacent the plunger and operatively connected with the drive shaft, a first cam mounted on the rotating shaft to selectively reciprocate the plunger, means for biasing the plunger in engagement with the first cam, a second cam mounted on the rotating shaft to selectively reciprocate the push rod, and means for biasing the push rod in engagement with the second cam.

11. Apparatus according to claim 7 wherein the holder includes a pivotally mounted jaw to receive the first part and hold it, and including means for storing a plurality of first parts adjacent the apparatus, means for transferring a first part from the means for storing the first part to the jaw, and means for pivoting the jaw to align it with the means for storing and transferring the first part.

12. Apparatus according to claim 7 wherein the means for moving the flange relative to the base plate include a reciprocating ram tangentially engaging the body when the first part is in the second location, spring means biasing the body into an original position, and means operatively engaging the drive shaft for reciprcoating the ram.

13. Apparatus according to claim 1 including means for frictionally engaging the periphery of the base plate to facilitate the positioning and securing by the indexing means of the base plate relative to the base.

14. Apparatus according to claim 1 including means for de-energizing the drive shaft when the indexing means fail to position and secure the base plate in the second position.

15. Apparatus according to claim 1 wherein the means for unidirectionally rotating the base plate include a first shaft rotatably mounted in the base and secured to the base plate, a first gear mounted on the first shaft, a second shaft mounted in the base, a second gear mounted on the second shaft and operatively engaging the first gear, a one-way clutch secured to the first gear and the first shaft to unidirectionally rotate the first shaft and the base plate, and means for rotating the second gear.

16. Apparatus according to claim 15 wherein the holding means include an elonagted slide secured to the base plate, a stationary guide track adjacent the slide, a movable guide track opposite and parallel to the stationary guide track and adjacent the slide, means for biasing the movable guide track toward the slide, a reciprocating elongated pusher engaging the first part and reciprocating on the slide in a direction defined by the guide tracks for moving the first part toward the second part in the second location, and means for reciprocating the elongated pusher.

17. Apparatus according to claim 16 wherein the elongated pusher is provided with a transverse recess adjacent the slide for holding the first part to the slide and for moving the first part toward the second part at the second location and including means adjacent to and level with the slide for receiving the first part.

18. Apparatus according to claim 17 including means for positioning the first part in the transverse recess of the pusher at the first location.

19. Apparatus according to claim 1 wherein the positioning means include a pivoting shaft adjacent the holding means, a cam secured to the drive shaft, means for operatively connecting the pivoting shaft and the cam such that the cam pivots the shaft when the first part is in the second location, and a lever secured to the pivoting shaft such that the lever moves the holding means toward the second part.

References Cited
UNITED STATES PATENTS

| | | | |
|---|---|---|---|
| 2,396,452 | 3/1946 | Widmark et al. | 29—200 |
| 2,810,249 | 10/1957 | Wysocki | 29—208 |
| 3,065,530 | 11/1962 | Merchant et al. | 29—208 |
| 3,127,669 | 4/1964 | Reber et al. | 29—211 X |
| 3,143,792 | 8/1964 | Swanson et al. | 29—208 |
| 3,178,000 | 4/1965 | Myska | 29—208 X |
| 3,187,420 | 6/1965 | Poupitch | 29—208 |
| 3,231,968 | 2/1966 | Swanson | 29—208 |
| 3,290,766 | 12/1966 | Castelet | 29—208 |
| 3,377,685 | 4/1968 | Carlstedt | 29—200 |

THOMAS H. EAGER, Primary Examiner

U.S. Cl. X.R.

29—200